US007424904B2

(12) United States Patent
Lammers et al.

(10) Patent No.: US 7,424,904 B2
(45) Date of Patent: Sep. 16, 2008

(54) TAPE DISPENSER WITH BATTERY-OPERATED HOT WIRE TAPE CUTTER

(76) Inventors: Anthony J. Lammers, 7628 Colvin Rd., Gates Mills, OH (US) 44040; John R. Nottingham, 19 E. Hanna La., Bratenahl, OH (US) 44108; John W. Spirk, 7890 Brigham Rd., Gate Mills, OH (US) 44040; Patrick W. Brown, 18051 Cinnamon Trail, Auburn, OH (US) 44255

( * ) Notice: Subject to any disclaimer, the term of this patent is extended or adjusted under 35 U.S.C. 154(b) by 428 days.

(21) Appl. No.: 11/131,934

(22) Filed: May 18, 2005

(65) Prior Publication Data

US 2005/0263252 A1 Dec. 1, 2005

Related U.S. Application Data

(60) Provisional application No. 60/610,913, filed on Sep. 17, 2004, provisional application No. 60/572,260, filed on May 18, 2004.

(51) Int. Cl.
*B32B 38/04* (2006.01)
*B26D 7/10* (2006.01)

(52) U.S. Cl. ...................... 156/523; 156/574; 156/577; 156/579

(58) Field of Classification Search ................. 156/574, 156/577, 523, 579
See application file for complete search history.

(56) References Cited

U.S. PATENT DOCUMENTS

| | | | | |
|---|---|---|---|---|
| 3,131,278 A * | 4/1964 | Rosenthal | 219/214 |
| 3,134,005 A * | 5/1964 | Mayhew | 83/171 |
| 3,494,235 A | 2/1970 | Postolowski | |
| 3,595,456 A * | 7/1971 | Rosenthal | 225/11 |
| 3,747,816 A | 7/1973 | Se-Kit | |
| 3,802,309 A | 4/1974 | Bosland | |
| 4,568,818 A * | 2/1986 | Ikemoto | 219/221 |
| 4,712,460 A | 12/1987 | Allen et al. | |
| 4,817,840 A | 4/1989 | Atkins et al. | |
| 4,944,441 A | 7/1990 | Gana | |
| D325,394 S | 4/1992 | Ishii | |
| 5,215,240 A | 6/1993 | Berg et al. | |
| 5,253,560 A * | 10/1993 | McDonald et al. | 83/171 |
| 5,275,073 A * | 1/1994 | Zemlak et al. | 83/171 |
| 5,579,669 A | 12/1996 | Kind et al. | |
| D448,416 S | 9/2001 | Kimura | |
| 6,453,575 B1 | 9/2002 | Hsieh | |

* cited by examiner

*Primary Examiner*—Mark A Osele
(74) *Attorney, Agent, or Firm*—Andrew J. Cornelius

(57) ABSTRACT

Disclosed is a tape dispenser including a housing configured to support a roll of tape, such that the tape is dispensable from the roll. A tape cutter is engageable with the tape. The tape cutter includes a heating element. A power source, such as batteries, is in electrical communication with the heating element. When a flow of electricity passes from the power source to the heating element, a temperature of the heating element increases to sever the tape. Buttons and/or switches are preferably included and designed as a safety feature. The buttons and switches are to be operated in a certain manner in order to prevent unwanted heating of the heating element.

4 Claims, 8 Drawing Sheets

TAPE DISPENSER WITH BATTERY-OPERATED HOT WIRE TAPE CUTTER

CROSS-REFERENCE TO RELATED APPLICATIONS

This application claims the benefit of U.S. Provisional Patent Application Ser. No. 60/572,260, filed May 18, 2004, as well as U.S. Provisional Patent Application Ser. No. 60/610,913, filed Sep. 17, 2004.

BACKGROUND OF THE INVENTION

1. Field of the Invention

This invention relates to devices for dispensing and applying adhesive tape, and especially to a mechanism for cutting adhesive tape dispensed from such a device.

2. Brief Description of the Prior Art

Various types of dispensers for adhesive tape are known. These can be generally classified as either handheld models or base-type models. Handheld models are designed to be held in one hand while the user applies tape to a surface. These models typically include a handle that supports a spool for holding a roll of tape and a device to guide and dispense the tape. Base-type models hold a roll of tape in a base designed to rest on a surface, such as a table or desktop, while the user pulls tape off of the roll. Both handheld and base-type dispensers typically include a sharp, usually serrated cutter for cutting the tape after the desired length of tape has been dispensed.

The tape cutters found on such prior art tape dispensers have several disadvantages. First, they are typically exposed, posing a danger that the user or others may be cut by the sharp edges. In addition, the teeth of such serrated cutters may be dulled or bent by accidentally striking the cutter against hard objects. In addition, in order to cut a piece of tape using such cutters, it is necessary to manipulate the tape or the tape dispenser in a way that exerts uneven force on the tape so that a cut or tear is initiated at one edge of the tape. Especially in the case of handheld tape dispensers, which are most commonly used with packaging tape that may be up to 3.5 inches wide, the twisting action needed to initiate the cut can result in twisting of the tape itself, causing the tape to stick to itself and resulting in wasted tape and frustration for the user.

SUMMARY OF THE INVENTION

Accordingly, it is an object of the present invention to provide a tape dispenser having a tape cutter capable of quickly and simply cutting a piece of tape without the need for exerting uneven force on the tape against the cutter. It is a further object of the present invention to provide such a tape dispenser having a tape cutter that does not present the risk of cutting the user. Another object of the present invention is to provide such a tape dispenser having a cutter that is not subject to dulling. Yet another object of the present invention is to provide such a tape dispenser having a hot wire tape cutter that requires the user to execute a simple series of coordinated actions in order to activate the hot wire tape cutter.

Specifically, the present invention provides a tape dispenser having a tape cutter that employs a resistance heating element heated by a momentary electrical current to rapidly burn through the tape at the point where the user desires to cut the tape. Since the resistance heating element burns through the entire width of the tape at one time, there is no need to twist the tape or the dispenser in order to cut the tape. In addition, there is no risk of the tape cutter becoming dull or cutting the user, since it does not employ sharp edges.

In a preferred embodiment, batteries power the tape cutter. Because of the low-voltage power supply of batteries, the resistance heating element only gets hot enough to cut the tape and thereafter cools quickly, minimizing the danger of burns. In addition, in order to minimize the possibility of accidental contact with the cutter, when not in use, the cutter is disposed within a compartment in the tape dispenser housing. In order to expose the cutter and initiate a flow of electricity to the heating element, the user must push a first button down, then slide a second button associated with the first button forward while also pressing the device against a surface, thus depressing a pivoting switch arm. When the second button is released, the cutter automatically retracts into its compartment within the housing of the dispenser, so that the cutter cannot be accidentally touched.

DETAILED DESCRIPTION OF THE INVENTION

Figure 1:
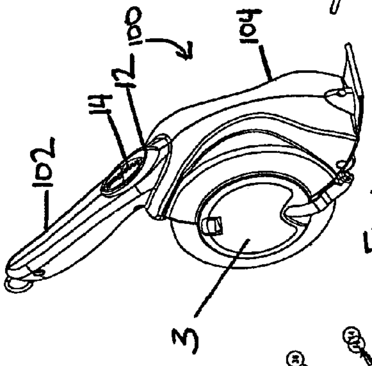
FIG. 1 is a front perspective view of a tape dispenser of the present invention showing a right side.

Using the above-identified figures, the invention will now be described with respect to various preferred embodiments. Although many specificities will be mentioned, it must be emphasized that the scope of the invention is not to be taken to be that of only the preferred embodiments, but should be construed in accordance with the claims appended hereto.

For purposes of the description hereinafter, the terms "upper," "lower," "right," "left," "vertical," "horizontal," "top," "bottom," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 17:
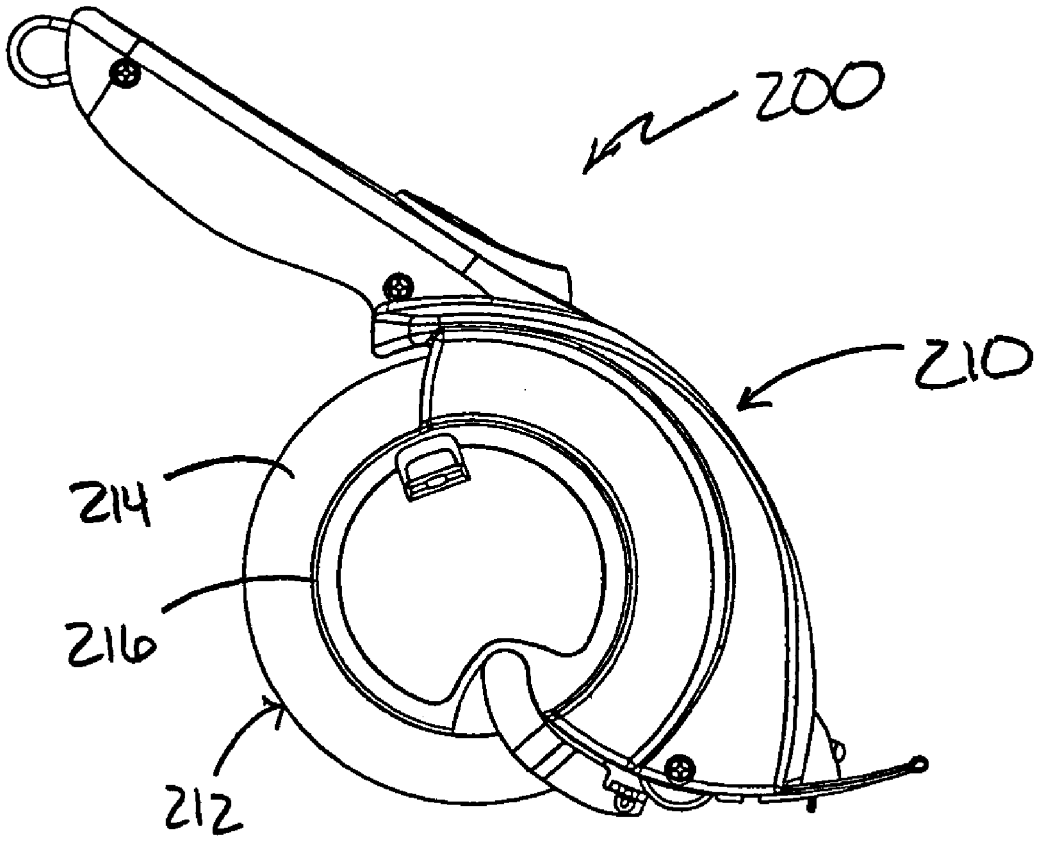
FIG. 17 is a side elevational view showing the right side of a tape dispenser of the present invention.
Figure 18:
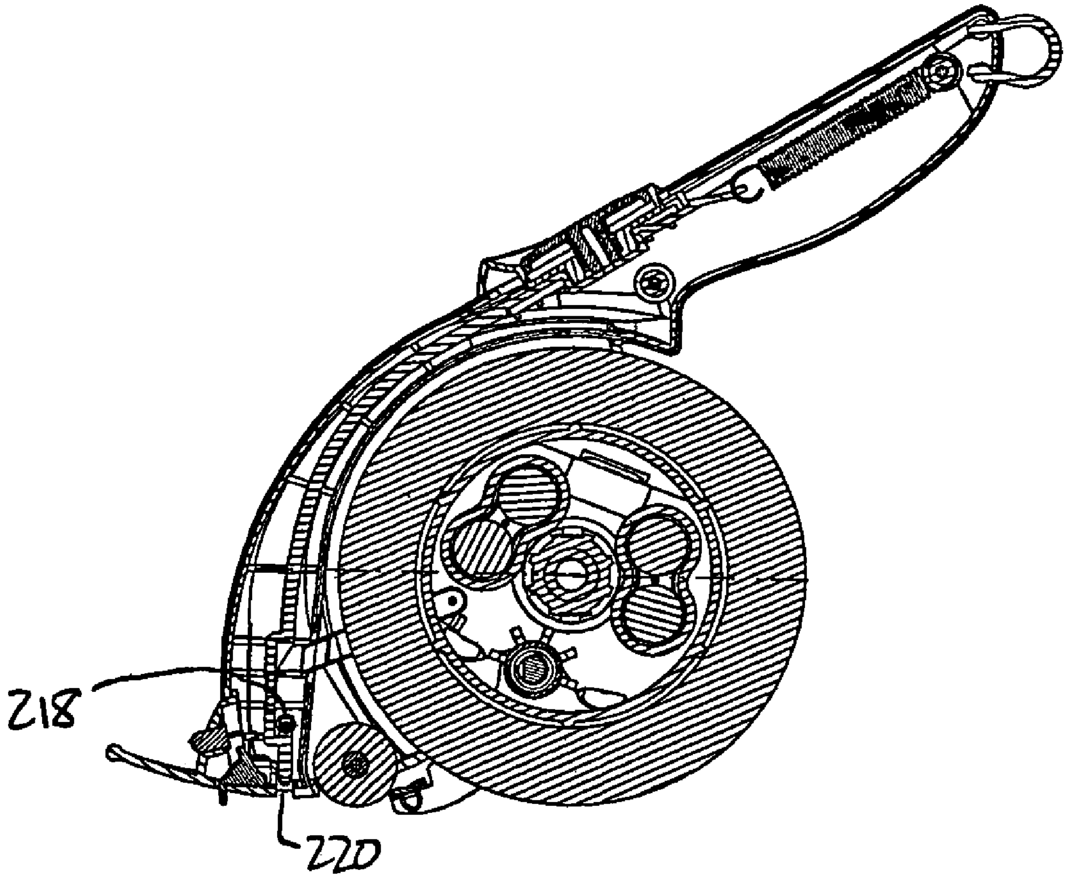
FIG. 18 is a cross-sectional view taken through a front of the tape dispenser illustrated in FIG. 17.

Referring to FIGS. 17 and 18, the present invention is a tape dispenser 200 including a housing 210. The housing 210 supports a roll of tape 212 so that the tape 214 is dispensable from a roll 216. A tape cutter 218 engages with the tape 214. The tape cutter 218 includes a heating element-220 in electrical communication with a power source. When a flow of electricity passes from the power source to the heating element 220, a temperature of the heating element increases to sever the tape 214.

Figure 2:
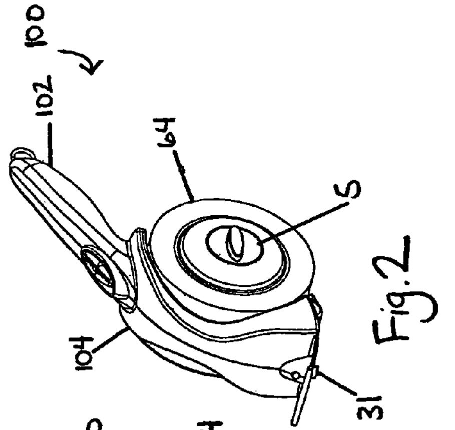
FIG. 2 is a front perspective view of the tape dispenser showing a left side.
Figure 3:
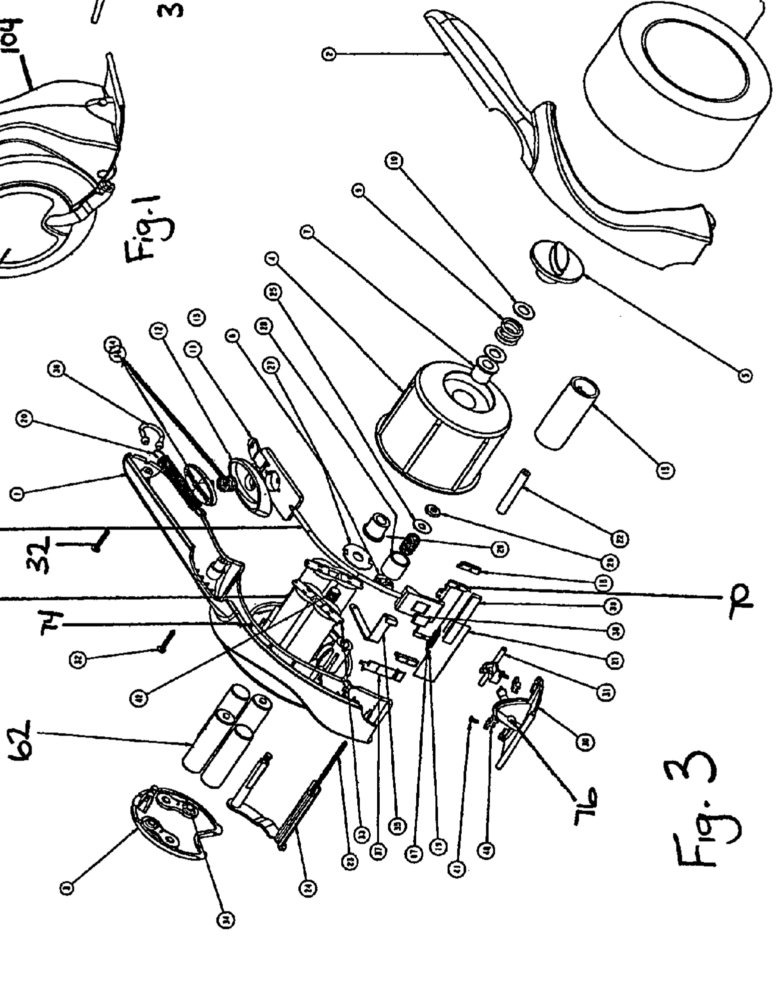
FIG. 3 is an exploded view of the tape dispenser.
Figure 4:
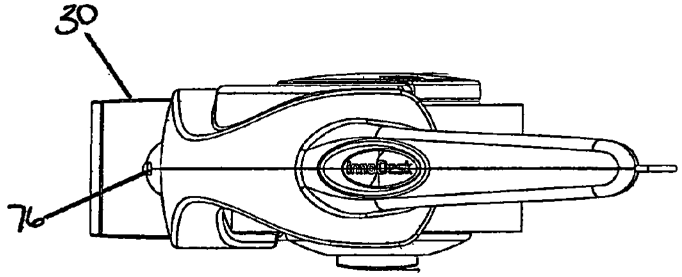
FIG. 4 is a top plan view of the tape dispenser.
Figure 5:
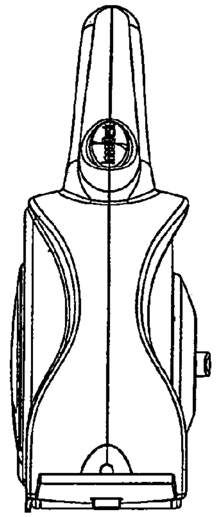
FIG. 5 is a front elevational view of the tape dispenser.

Referring to FIGS. 1-3, a preferred embodiment handheld tape dispenser 100 has a right housing portion 1 and a left housing portion 2, which are joined together by handle portion screws 32 and a frame portion screw 23, forming a handle portion 102 and a frame portion 104. The housing portions are preferably constructed of a lightweight, durable material, such as high-impact plastic. A hanger loop 36 is attached at an end of handle portion 102 to allow tape dispenser 100 to be conveniently hung from a hook.

Right housing portion 1 includes a battery compartment 60 to hold batteries 62, which are retained within battery compartment 60 by battery door 3.

Tape spindle 4 is rotatably mounted on tape spindle bolt 42 so that it covers battery compartment 60 and is retained on tape spindle bolt 42 by tensioning knob 5. A tape roll 64 is retained on tape spindle 4 via a friction fit.

A sliding button 12 and a push button 14, having a button compression spring 16 disposed therebetween, are retained on hot wire switch chassis 11 by button retaining screw 13 in such a way that sliding button 12 and push button 14 are disposed on top of and toward the front of handle portion 102.

Hot wire switch chassis 11 is connected to a tape cutter bar 70 by linkage 72, which is disposed within a channel 74 within frame portion 104. A resistance heating wire 21 is mounted on tape cutter bar 70. In the resting position, when the tape dispenser is not in use, tape cutter bar 70 is disposed in a compartment in a front of frame portion 104.

Sliding button 12 and push button 14 are so arranged that sliding button 12 cannot slide forward until push button 14 is depressed. When push button 14 is depressed and sliding button 12 is pushed forward, linkage 72 pushes tape cutter bar 70 out of the compartment in frame portion 104. Chassis lock extension spring 20 has one end attached to a back of hot wire switch chassis 11 and another end attached to handle portion screw 32 at a back of handle portion 102, so that when sliding button 12 is released, chassis lock extension spring 20 will pull hot wire chassis 11 toward a rear of handle portion 102, causing tape cutter bar 70 to retract into the compartment in frame portion 104.

Referring to FIGS. 3, 6, 7, and 9, tape guide 24 is mounted on frame portion 104, so that it extends transversely across a path of the tape. Hollow spacer 22 is coaxially disposed within hollow roller 15. Roller 15 is disposed transversely between forward portions of right and left housing portions 1, 2, respectively, and can rotate freely about spacer 22. Tape is threaded from tape roll 64 around tape guide 24 and roller 15 and toward front of tape dispenser 100. Tape guide 24 may be mounted such that it is moveable between a load tape position and a use position. The load tape position facilitates loading tape roll 64 on tape spindle 4 when the construction of tape guide 24 and roller 15 provides minimal clearance for the path of the tape. The use position permits proper use of tape dispenser 100.

A tape wiper 30 is affixed to the front of tape dispenser 100 to press the tape down as it is applied in order to smooth wrinkles and remove air bubbles under the tape.

Figure 6:
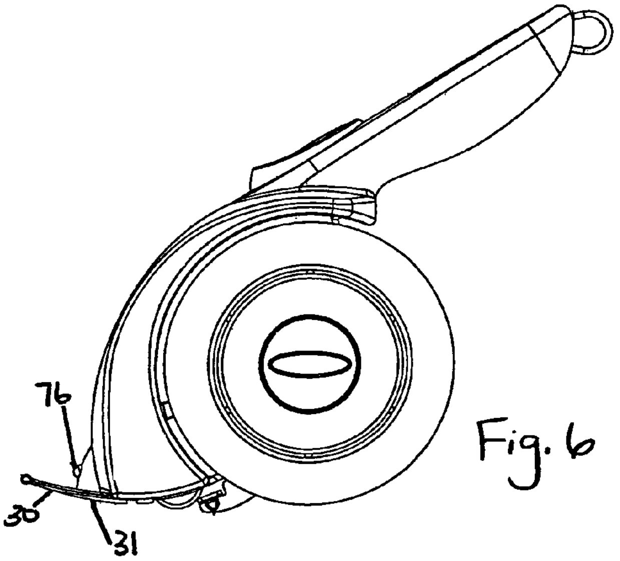
FIG. 6 is a side elevational view showing the left side of the tape dispenser.
Figure 7:
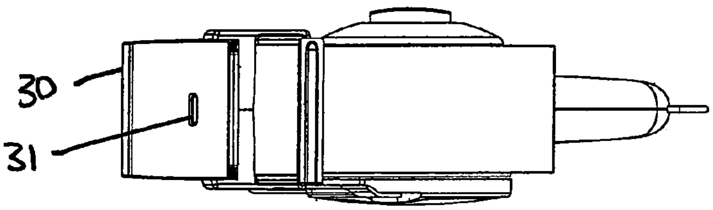
FIG. 7 is a bottom plan view of the tape dispenser.
Figure 8:
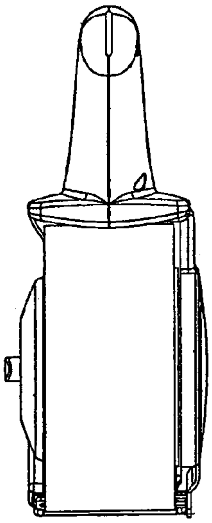
FIG. 8 is a rear elevational view of the tape dispenser.
Figure 9:
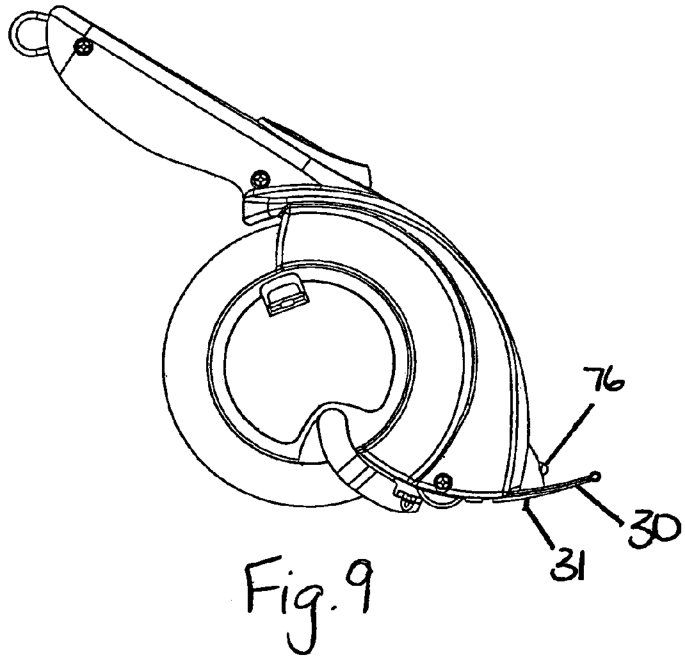
FIG. 9 is a side elevational view showing the right side of the tape dispenser.
Figure 10:
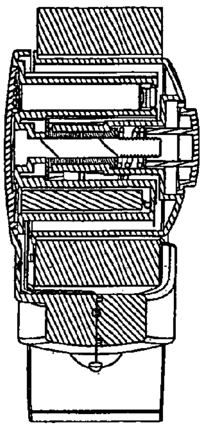
FIG. 10 is an elevational view of the tape dispenser indicating the cross sections for FIGS. 11, 12, 14, 15, and 16.
Figure 13:
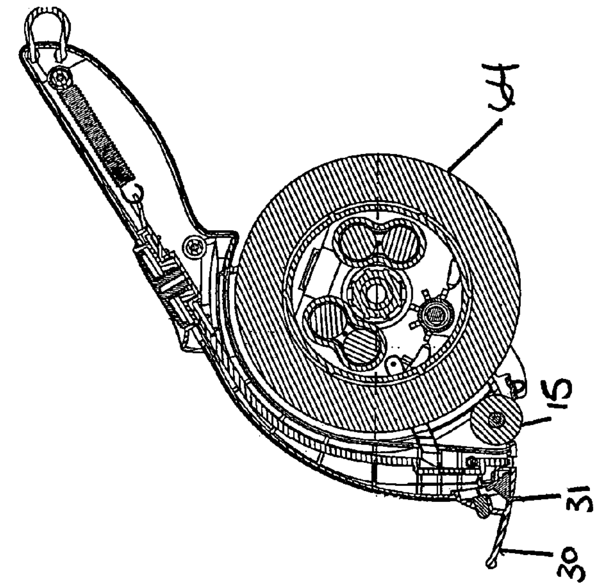
FIG. 13 is a cross-sectional view taken through a switch pivot as indicated in FIG. 10.
Figure 12:
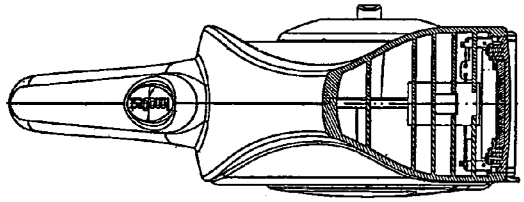
FIG. 12 is a cross-sectional view taken through a roller as indicated in FIG. 10.
Figure 11:
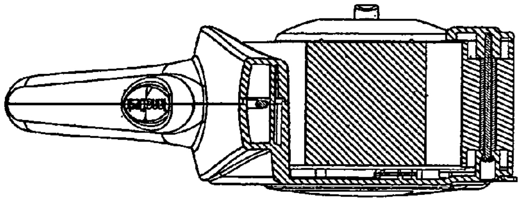
FIG. 11 is a cross-sectional view taken through a top as indicated in FIG. 10.
Figure 14:
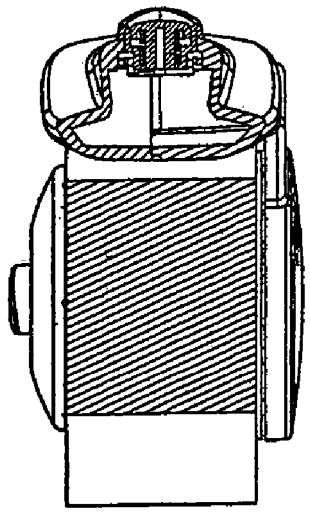
FIG. 14 is a cross-sectional view taken through a front as indicated in FIG. 10.
Figure 15:
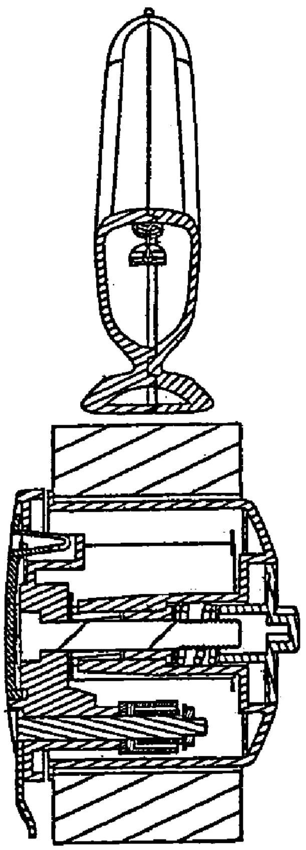
FIG. 15 is a cross-sectional view taken through a switch as indicated in FIG. 10.
Figure 16:
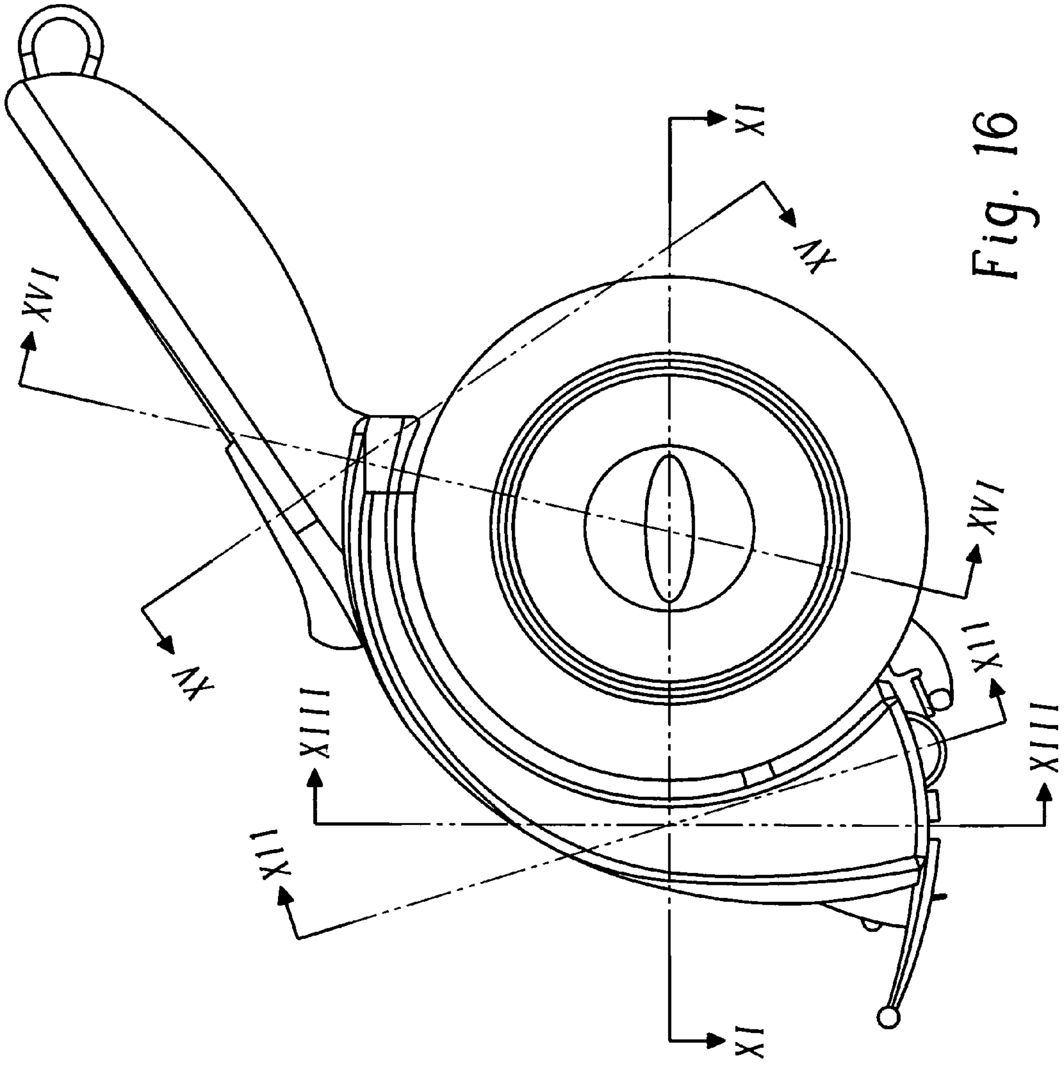
FIG. 16 is a cross-sectional view taken through a guide as indicated in FIG. 10.

A switch arm 31 is pivotingly connected at a rear of tape wiper 30 so that a portion of switch arm 31 protrudes through an opening in a bottom of tape wiper 30 (best seen in FIGS. 6, 7, and 9). When switch arm 31 engages a surface, switch arm 31 is pushed up through the opening in tape wiper 31.

When tape cutter bar 70 is pushed out of the compartment in frame portion 104 and switch arm 31 is pushed up through the opening in the bottom of tape wiper 30, electrical contacts are closed to complete a circuit with batteries 62, causing current to flow through resistance heating wire 21.

In the embodiment illustrated, the current also results in illumination of an optional light emitting diode 76 positioned on tape wiper 30, which signals when current is flowing through resistance heating wire 21.

Since sliding button 12 cannot be pushed forward to expose tape cutter bar 70 until push button 14 is depressed, and current cannot flow through resistance heating wire 21 until cutter bar 70 is exposed and switch arm 31 is depressed, all of these operations must be completed before resistance heating wire 21 becomes hot. When one operation is undone, electrical current is terminated. Optionally, a time-out device may be incorporated to automatically terminate the electrical current through the resistance heating wire 21 after a predetermined time in order to ensure that the resistance heating wire 21 is deenergized if the push button 14 and sliding button 12 are not released. These features are safety-conscious to aid in the prevention of unintended harm to a user or article.

In use, a user presses roller 15 against the surface where tape is to be applied, such as a shipping carton. Tape that has been threaded from tape roll 64 around tape guide 24 and roller 15 adheres to the surface. The user draws tape dispenser 100 backward across the surface, causing additional tape to be applied while pressing tape wiper 30 down on the freshly-applied tape in order to smooth out any bubbles or wrinkles. When the desired amount of tape has been applied, the user depresses push button 14 and pushes sliding button 12 forward, causing linkage 72 to push tape cutter bar 70 out of the compartment in frame portion 104 and into contact with the tape. Pressing tape wiper 30 against the surface of the tape pushes switch arm 31 up through the opening in the bottom of tape wiper 30, closing the electrical contacts (not shown) associated with the switch arm 31, thereby permitting current to flow through resistance heating wire 21. Resistance heating wire 21 rapidly becomes hot enough to melt through the tape. Once the tape has been melted, the user releases push button 14 and sliding button 12, allowing tape cutter bar 70 to retract.

The retractable tape cutter bar having a resistance heating element that heats up in order to burn through tape may also be used in base-type embodiments of the present invention (not shown in the Figures). In other embodiments (not shown) power to heat the resistance heating element could be provided from an external A/C power source, rather than from batteries.

According to the provisions of the patent statutes, we have explained the principle, preferred construction, and mode of operation of the invention, and have illustrated and described what we now consider to represent its best embodiments. However, it should be understood that within the scope of the foregoing description and the claims appended hereto, the invention may be practiced otherwise than a specifically illustrated and described.

The invention claimed is:

1. A tape dispenser, comprising:

a housing configured to support a roll of tape, such that the tape is dispensable from the roll;

a tape cutter engageable with the tape, the tape cutter including a heating element; and a power source in electrical communication with the heating element, wherein when a flow of electricity passes from the power source to the heating element, a temperature of the heating element increases to sever the tape;

a safety mechanism that must be activated in order for the flow of electricity to commence and maintain, wherein force exerted from a surface to the safety mechanism activates the safety mechanism; and a tape wiper affixed to a front of the tape dispenser.

2. The tape dispenser according to claim 1 wherein the safety mechanism is a switch arm.

3. The tape dispenser according to claim 2 wherein the tape wiper defines an opening through which the switch arm is projectable.

4. A tape dispenser, comprising:

a housing configured to support a roll of tape, such that the tape is dispensable from the roll;

a tape cutter engageable with the tape, the tape cutter including a heating element; and a power source in electrical communication with the heating element, wherein when a flow of electricity passes from the power source to the heating element, a temperature of the heating element increases to sever the tape; and a tape wiper affixed to a front of the tape dispenser.

* * * * *